United States Patent [19]

Baer et al.

[11] Patent Number: 5,413,197
[45] Date of Patent: May 9, 1995

[54] PARKING BRAKE VALVE

[76] Inventors: Larry G. Baer, 3713 Fairfield Dr.;
Walt Pyndus, 404 Coulter Rd., both of Maryville, Tenn. 37804

[21] Appl. No.: 212,213
[22] Filed: Mar. 14, 1994
[51] Int. Cl.$^6$ .......................... B60T 11/00; B60R 25/00
[52] U.S. Cl. ..................... 188/353; 188/1.11; 180/287
[58] Field of Search ................ 188/1.11, 265, 353; 303/89; 180/287

[56] References Cited

U.S. PATENT DOCUMENTS 4,546,846  10/1985  Myers ................... 188/353 X

FOREIGN PATENT DOCUMENTS

| 7407327 | 9/1975 | France ............... 180/287 |
| 249863 | 11/1986 | Japan ............... 188/1.11 |
| 2161875 | 1/1986 | United Kingdom ............... 188/353 |
| 2247727 | 3/1992 | United Kingdom ............... 188/353 |

*Primary Examiner*—Robert J. Oberleitner
*Assistant Examiner*—Kevin D. Rutherford
*Attorney, Agent, or Firm*—Daryl C. Josephson; Kevin A. Sembrat

[57] ABSTRACT

A parking brake valve includes a magnetically attractable sled containing fluid stoppers and fluid passers that moves along a track, a fluid exchange unit, solenoids at either end of the track and a remote actuator. The parking brake valve is added to an existing hydraulic vehicle braking system. When the existing braking system is actuated, braking fluid is forced through the parking brake valve. Activating a locking solenoid attracts the sled into a fluid interrupting or locking position, thereby locking the brake system in a braking state. Activating an unlocking solenoid moves the sled such that brake fluid can again flow through the parking brake valve, thereby allowing the braking system to function normally. Integral fluid pressure valves allow the monitoring of fluid pressure within the parking brake valve allowing operation to be monitored. Frequency matching and security identification prevent unauthorized use while a safety switch ensures that fluid interrupting is possible only when the vehicle is shifted into park.

8 Claims, 3 Drawing Sheets

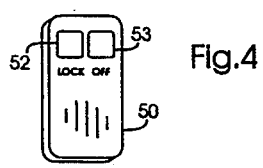
Fig.4
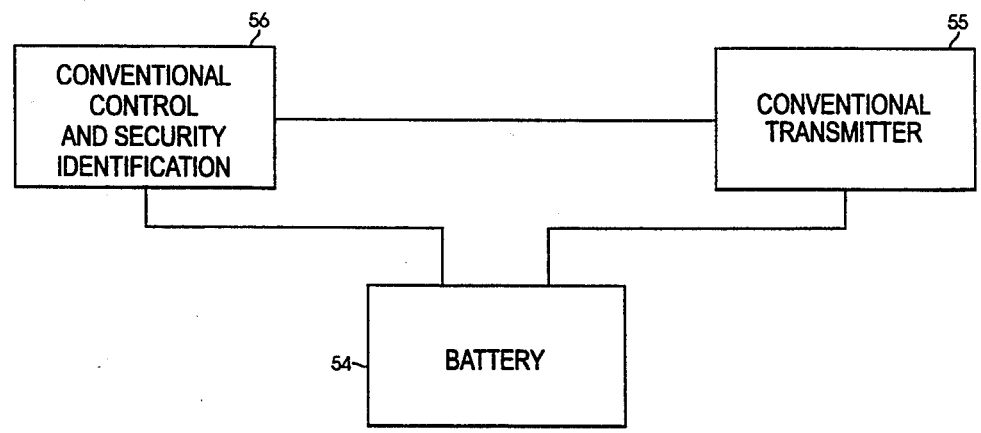
Fig.5
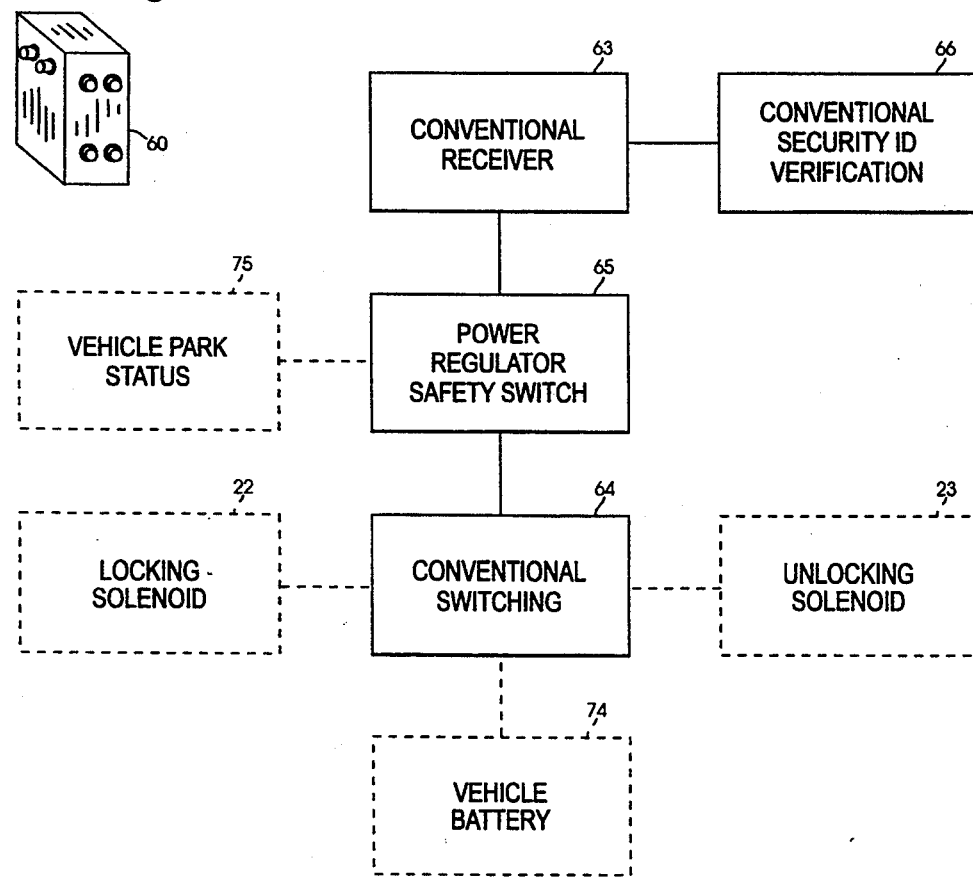

PARKING BRAKE VALVE

BACKGROUND OF THE INVENTION

1. Field of Invention

The invention relates to motor vehicle braking systems and anti-theft devices.

2. Description of the Prior Art

Parking brake systems for motor vehicles typically comprise a mechanical actuator within the passenger compartment which is mechanically connected to and operates hydraulic brakes. Such a system is commonly employed as a safety device wherein the operator engages the parking brake while the vehicle is stopped before exiting the vehicle. The intended result is to prevent the unattended vehicle from moving in the event that other primary braking systems might fail to prevent such movement.

One disadvantage of current hydraulic parking brake systems is that the physical properties of mechanical actuators utilizing differing materials renders the parking brake systems subject to restricted movement in extreme cold weather causing difficulty in actuating the parking brake.

In addition, various motor vehicle, anti-theft devices are commonly employed. Such devices either act to warn of impending intrusion to the vehicle, to ward off an intruder or, more germane here, to prevent the vehicle from being operated by persons other than those so authorized by the vehicle owner. Such operation-hindering devices are engaged to inhibit a specific vehicle control function, typically steering, from operating and are disengaged for authorized use. These devices are typically controlled by an actuator whose location in the vehicle is known only to those authorized by the owner or those that are difficult to disable without, for example, a key.

One disadvantage of current vehicle anti-theft devices is that they are typically connected to actuators within the passenger compartment of the vehicle, thereby increasing the possibility of being identified and disabled by an intruder.

A second disadvantage of current vehicle anti-theft devices is that they are an addition to the vehicle solely for the purpose of inhibiting or preventing theft, thereby increasing the overall cost of owning and operating the vehicle.

Finally, since the only purpose served by conventional anti-theft devices is to hinder or prevent theft, status indicators are typically either absent or are strategically, and therefore inconveniently, located in order to defeat detection by unauthorized users.

Accordingly, there is a need in the motor vehicle industry for a reliable Parking Brake Valve as an alternative to existing hydraulic parking brake actuator systems and/or as an integral, secure vehicle anti-theft device.

SUMMARY OF THE INVENTION

An object of the invention is to provide a vehicle Parking Brake Valve (Valve) that is compatible with existing hydraulic braking systems and resistant to the effects of extreme cold on actuation, such that it can be added to motor vehicles as an alternative to using the existing parking brake or as a functional replacement for conventional parking brakes.

A second object of the invention is to provide a Parking Brake Valve that can also be added in an unobtrusive way to an existing brake system as a vehicle anti-theft device. Here, the Valve serves as an anti-theft device by locking the vehicle in a braking position that cannot be readily disabled by an intruder.

A third object of the invention, as a vehicle anti-theft device, is for the Valve actuator to be removable by the driver such that it cannot be used to disable the Valve by an intruder.

A fourth object of the invention is to provide means for indicating brake fluid pressure, and therefore the on off status of the Parking Brake Valve, to the vehicle operator utilizing existing and/or additional status indicators. Utilizing an existing status light or pressure gauge minimizes cost and installation time in addition to making the Parking Brake Valve operation unobtrusive for anti-theft applications. Utilizing only a dedicated status light or pressure gauge allows independent monitoring. Utilizing two status lights or pressure gauges allows separate monitoring of the front and rear brakes.

These and other features, objects and advantages of the invention can best be understood by reference to the following description thereof together with the drawings.

BRIEF DESCRIPTION OF THE DRAWINGS

FIG. 4 is a functional diagram of a remote transmitter for actuation of the Parking Brake Valve.

FIG. 5 is a functional diagram of an integral receiver for actuation of the Parking Brake Valve.

DETAILED DESCRIPTION OF THE PREFERRED EMBODIMENT

Figure 1:
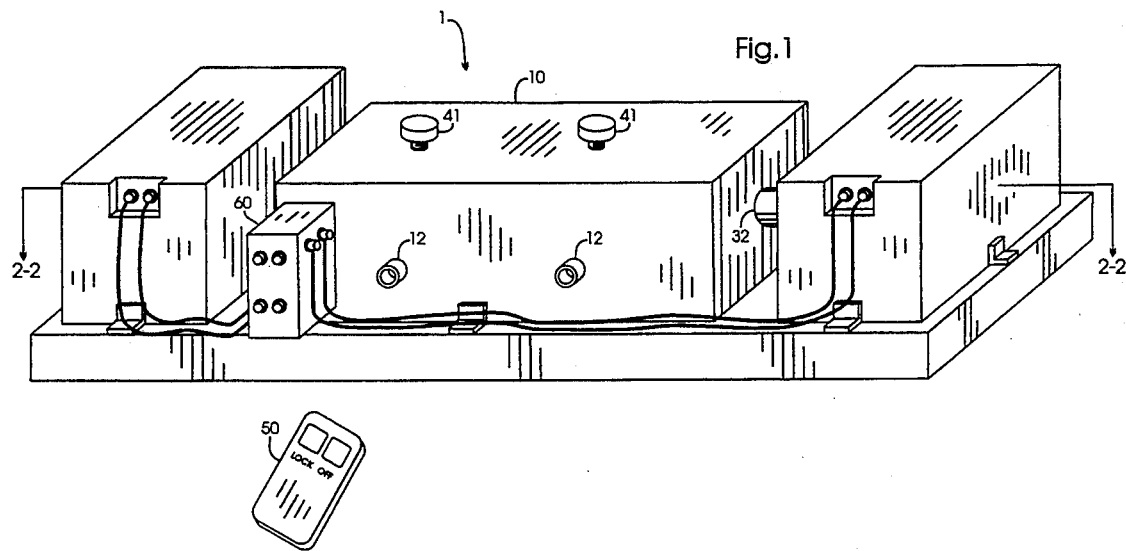
FIG. 1 is a from perspective view of the Parking Brake Valve

Referring to the drawings, the present invention is shown generally in FIGS. 1 through 5.

Figure 2:
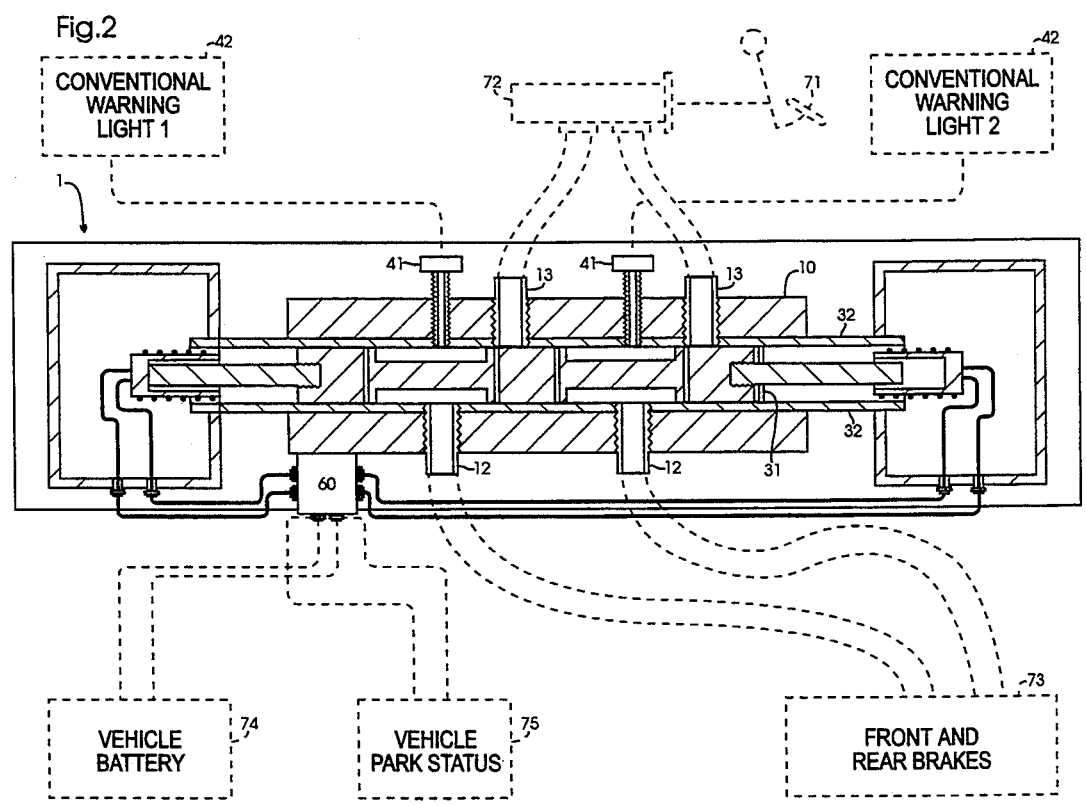
FIG. 2 is a cutaway view thereof along line 2—2 of FIG. 1 showing how the Parking Brake Valve is integrated within an existing hydraulic motor vehicle braking system, wherein the pressure valves have been moved to the back and the mounting brackets have been removed for clarity of operation.
Figure 3A:
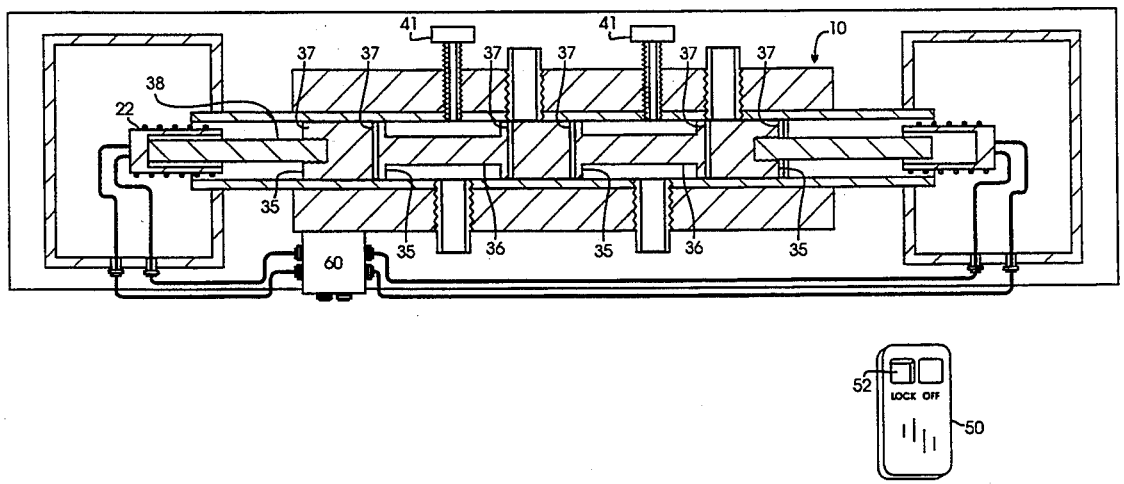
FIG. 3a is a cutaway view thereof as in FIG. 2 with the environmental structures removed, wherein the Parking Brake Valve is in a fluid-interrupting or lock position.
Figure 3B:
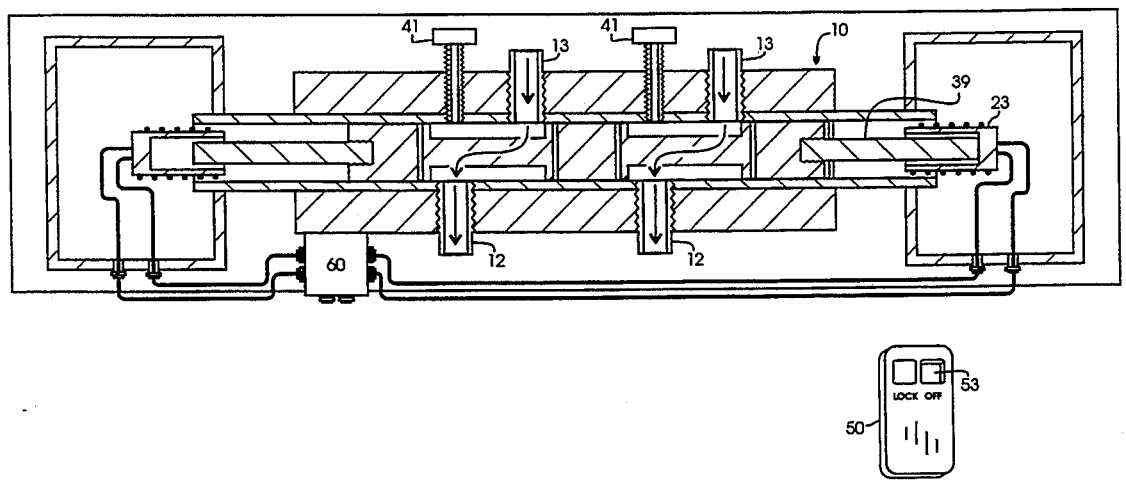
FIG. 3b is a cutaway view thereof as in FIG. 3a wherein the Parking Brake Valve is in a noninterrupting or off position.

FIGS. 1 through 3b show how the Parking Brake Valve 1 acts as a remote control activated, brake fluid locking mechanism for a conventional hydraulic braking system in an automatic transmission automobile. Depressing the brake pedal 71 actuates the conventional brake system, which conventional brake system comprises a master cylinder 72 and front and rear brakes 73, as shown in FIG. 2, thereby increasing fluid pressure and actuating the brakes 73 (FIG. 2). Actuating a remote transmitter 50 then initiates closing of the Parking Brake Valve 1 thereby preventing fluid pressure from decreasing and thus locking the brakes 73 in a braking position (FIG. 3a). The remote transmitter 50 is also utilized to open the Parking Brake Valve, thereby allowing the trapped brake fluid to flow, thus decreasing fluid pressure and releasing the brakes 73 (FIG. 3b). Conventional pressure valves 41 integral to the Parking Brake Valve 1 can be connected to existing or dedicated conventional warning lights 42, thereby allowing the operator to monitor high/low overall brake fluid pressure status or front and rear brake fluid pressure status individually. The Parking Brake Valve 1 is powered by the existing vehicle battery 74. Protection against unauthorized and inadvertent operation are detailed below.

The brake fluid locking functionality of the Parking Brake Valve 1 is achieved through the use of a valve sled 31, a hollow-core locking solenoid 22 and a hollow-core unlocking solenoid 23 at either end of a valve sled track 32 and a receiver/control unit 60. In a preferred embodiment, the solenoids 22 and 23 are positioned proximate to opposing ends of the valve sled track 32, such that each of the solenoids 22 and 32 extend at least partially within the sled track 32, as shown in FIGS. 2, 3a and 3b. FIGS. 3a and 3b show how the valve sled 31 includes fluid-stopping blocks 35 and fluid-passing beams 36 which are separated using conventional brake seals 37, in addition to magnetically attractable rods 38 and 39.

When the lock button 52 on the remote transmitter 50 is depressed, the locking solenoid 22 is activated, thereby attracting the magnetically attractable locking rod 38 and therefore the valve sled 31 to a locked position (FIG. 3a). While brake fluid can move freely through the fluid inlets 12 and around the fluid-passing beams 36 of the valve sled 31, brake fluid cannot flow through the fluid outlets 13, which are effectively blocked by the fluid-stopping blocks 35. Depressing the lock button 52 while the brake pedal 71 is depressed therefore prevents brake fluid movement and thus locks the brakes 73 in a braking position.

When the off button 53 on the remote transmitter 50 is depressed, the unlocking solenoid 23 is activated, thereby attracting the magnetically attractable unlocking rod 39 and therefore the valve sled 31 to an unlocked position (FIG. 3b). In this position, both the fluid inlets 12 and fluid outlets 13 are lined up with fluid-passing beams 36 such that trapped brake fluid can flow, thus lowering the brake fluid pressure and releasing the brakes 73, As FIGS. 4 and 5 indicate, the remote transmitter 50 employs conventional electronic components to transmit a low power signal to the receiver control unit 60 of the Parking Brake Valve 1 when the lock button 52 or off button 53 is depressed.

Protection against unauthorized and inadvertent operation are ensured through the use of conventional frequency matching, remote identification and mode monitoring techniques. When either actuator button 52 or 53 of the remote transmitter 50 is depressed, an encoded identification number is broadcast on a unique frequency, followed by identification of the button depressed. The receiver controller 60 receiving frequency must first match the frequency broadcast for actuation to occur. In addition, a received identification number must match that encoded in the receiver controller 60. Finally, the lock button 52 control and security identification 56 from a conventional transmitter 55 will be disregarded by a conventional security ID 66 and a conventional receiver 63, unless the gear shift lever of the automobile is set to park, thereby producing a vehicle park status indicator 75 and enabling the power regulator safety switch 65.

While the above description contains many specificities, these should not be construed as limitations on the scope of the invention, but rather as an example of the preferred embodiment thereof. Many other variations are possible.

For example, the positioning of the fluid inlets 12 and fluid outlets 13 is critical only in that it corresponds with the fluid stopping block 35 and fluid-passing beam 36 positions for preventing and allowing the flow of brake fluid. The positioning of the pressure valves 41 is similarly critical only in that they must be positioned over the fluid passing beams 36 in such a way that the high/low fluid pressure status can be ascertained. In the preferred embodiment, such factors as existing hose position and access for installation and maintenance have been considered in order to determine positioning of the pressure valves 41 on top of the fluid exchange unit 10 and the fluid inlets 12 and fluid outlets 13 on the front and rear sides of the fluid-exchange unit 10.

A second example is that the Parking Brake Valve 1, in addition to its use in automobiles, can also be used as a brake locking mechanism and/or as a parking brake replacement for other vehicles utilizing a conventional single or multiple hydraulic braking system.

A third example is that while I-shaped beams and solid blocks have been utilized due to their inherent strength and reliability, other means of fluid control such as gratings and hollow blocks can also be utilized.

A fourth example is that while utilizing magnetically attractable rods 38 and 39 allows the use of other lighter and less expensive materials for fabrication of the other valve sled 31 components, the valve sled 31 itself could be fabricated using magnetically attractable materials.

A fifth example is the use of a unified fluid exchange unit 10 and valve sled track 32 as a replacement for the separated parts of the preferred embodiment. The advantage of separated units is in the ability to assure a smooth and completely enclosed track surface. Alternatively hollowing out metal block to form a sled track may be less expensive, although a housing would then be required to protect the now exposed magnetically attractable rods. Finally, a single button (on/off) remote transmitter 50 or even a "hard wired" actuator can be used. A remote transmitter is preferred due to its inaccessibility by a vehicle intruder. In addition, while not critical to the invention, a tamper warning signal could be added and connected to a conventional vehicle alarm in order to alert the vehicle owner of attempted tampering by unauthorized persons. Methods of providing secondary security other than frequency matching and/or identification codes are also possible through conventional means.

I claim:

1. A parking brake valve comprising:
a tubular track having an inner surface, an outer surface, a locking end and an unlocking end, said inner surface and outer surface defining an outer casing, said outer casing defining a plurality of inlet holes and an equivalent number of outlet holes, each extending from said outer surface to said inner surface of said track;
a sled having an outer surface, a stopping end and an unstopping end, said sled also having a plurality of stoppers and fluid passers, Said sled being of such size and shape that it abuts and can slide along said inner surface of said track, said stoppers being of such size and shape that when said sled is in a locking position within said track such that the stopping end of said sled is proximate to the locking end of said track, said stoppers prevent fluid from passing between inlet holes and outlet holes, said fluid passers being of such size and shape that when said sled is an unlocking position within said track such that the unstopping end of said sled is proximate to the unlocking end of said track, said fluid passers permit fluid to flow between inlet holes and outlet holes, said sled also having a plurality of conventional brake seals for preventing fluid leakage and affixing said stoppers and fluid passers together as a sled;

sled-moving means for moving said sled within said track longitudinally between its locking position and unlocking position;

actuator means for initiating operation of said sled-moving means and thereby determine the sled position longitudinally within said track;

a braking system interface having an outer surface, an inner surface, a plurality of conventional hydraulic motor vehicle braking system inlet hose connectors and a plurality of conventional hydraulic motor vehicle braking system outlet hose connectors, each inlet hose connector extending from said inner surface of said track, sealingly through an inlet hole and protruding beyond said outer surface of said braking system interface, each outlet hose connector extending from said inner surface of said track, sealingly through an outlet hole and protruding beyond said outer surface of said braking system interface, whereby a conventional hydraulic motor vehicle braking system can be actuated and then moving said sled to its locking position acts to prevent the flow of brake fluid, thereby locking the vehicle braking system in a braking state, and moving said sled to its unlocking position acts to allow the flow of brake fluid, thereby allowing the vehicle braking system to return to a non-interrupted braking state;

a plurality of conventional pressure switches, each pressure switch extending from said inner surface of said track, sealingly through pressure holes defined by the casing of said track, sealingly through pressure holes defined by said outer surface of said braking system interface and protruding outward from said outer surface of said braking system interface, thereby allowing fluid pressure within said fluid passers of said sled to be monitored;

wherein said actuator means comprises a conventional remote transmitter, a conventional frequency matched receiver and a switch, thereby allowing said sled-moving means to be remotely actuated and thus allowing said sled to be remotely moved longitudinally within said track between its locking position and unlocking position:

wherein said remote transmitter and said receiver further comprise conventional security means whereby the parking brake valve is secure from actuation utilizing other than a matched transmitter;

conventional tamper-protection circuitry and means for connecting this circuitry to a conventional vehicle alarm system:

wherein said sled moving means is comprised of two solenoids, a locking solenoid being positioned proximate to the locking end of said track and an unlocking solenoid being positioned proximate to the unlocking end of said track, thereby actuation of the locking solenoid causing said sled to be magnetically attracted to its locking position and actuation of the unlocking solenoid causing said sled to be magnetically attracted to its unlocking position; and wherein said solenoids are of a hollow-core type and said sled further comprises a magnetically attractable fluid interrupting rod affixed longitudinally to its stopping end and a magnetically attractable fluid uninterrupting rod affixed longitudinally to its unstopping end, for allowing other sled components to be composed of materials that are not magnetically attractable.

2. A parking brake valve comprising:

a base having a top surface and a bottom surface, said top surface having a first integral solenoid mounting area, an integral interface mounting area abutting said first solenoid mounting area and a second integral solenoid mounting area abutting said interface mounting area, said base also having a plurality of mounting means integral to said top surface and said bottom surface;

a tubular track having an inner surface, an outer surface, a locking end and an unlocking end, said inner surface and outer surface defining an outer casing, said outer casing defining a plurality of inlet holes and an equivalent number of outlet holes, each extending from the outer surface to said inner surface of the track;

a sled having an outer surface, a stopping end and an unstopping end, the sled also having a plurality of integral, longitudinally abutting stoppers, fluid passers and conventional brake seals, said sled being of such size and shape that it abuts and can slide along said inner surface of the track, said stoppers having a solid outer surface, the outer surface of said stoppers abutting and conforming to said inner surface of said track, the stoppers being of such length that when said sled is in a locking position within said track such that the stopping end of said sled is proximate to the locking end of said track, said stoppers prevent fluid from passing between inlet holes and outlet holes, said fluid passers being H-shaped and being of such length that when said sled is in an unlocking position within said track such that the unstopping end of said sled is proximate to the unlocking end of said track, said fluid passers permit fluid to flow between inlet holes and outlet holes, said brake seals having an outer surface that abuts and conforms to the inner surface of said track, said brake seals being affixed longitudinally between stoppers and fluid passers and extending to, abutting and conforming to the inner surface of said track, thereby preventing the flow of fluid between said stoppers and fluid passers, said sled being comprised of a magnetically attractable material;

sled-moving means for moving said sled within said track longitudinally between its locking position and unlocking position, wherein said sled moving means is comprised of two solenoid units, a locking solenoid unit being affixed proximate to the locking end of said track and said first solenoid mounting area of said base, located at least partially within said track, and an unlocking solenoid unit being affixed to the unlocking end of said track and said second solenoid mounting area of said base, located at least partially within said track, with said locking solenoid unit containing a locking solenoid and said unlocking solenoid unit containing an unlocking solenoid, thereby actuation of said locking solenoid causes said sled to be magnetically attracted to its locking position and actuation of said unlocking solenoid causes said sled to be magnetically attracted to its unlocking position;

actuator means for initiating operation of said sled-moving means and thereby determine the sled position longitudinally within said track; and a braking system interface having an outer surface, an inner surface, a plurality of conventional hydraulic motor vehicle braking system inlet hose connectors and a plurality of conventional hydraulic motor vehicle braking system outlet hose connectors, each inlet hose connector extending from said inner surface of said track, sealingly through an inlet hole and protruding beyond the outer surface of the braking system interface, each outlet hose connector extending from said inner surface of said track, sealingly through an outlet hole and protruding beyond the outer surface of said braking system interface, whereby a conventional hydraulic motor vehicle breaking system can be actuated and then moving said sled to its locking position acts to prevent the flow of brake fluid, thereby locking the vehicle braking system in a braking state, and moving said sled to its unlocking position acts to allow the flow of brake fluid, thereby allowing the vehicle braking system to return to a non-interrupted braking state, said braking system interface being affixed to said interface mounting area of said base.

3. A parking brake valve as defined in claim 2 further comprising a parking mode sensing means for preventing the sled from being moved into a fluid locking position in automotive applications unless a conventional park mode is first engaged.

4. A parking brake valve as defined in claim 2 further comprising a plurality of conventional pressure switches, each pressure switch extending from the inner surface of the track, sealingly through pressure holes defined by the casing of the track, sealingly through pressure holes defined by the outer surface of the braking system interface and protruding outward from the outer surface of the braking system interface, thereby allowing fluid pressure within the fluid passers of the sled to be monitored.

5. A parking brake valve as defined in claim 2 wherein the actuator means comprises a conventional remote transmitter, a conventional frequency matched receiver and a switch, thereby allowing the sled-moving means to be remotely actuated and thus allowing the sled to be remotely moved longitudinally within the track between its locking position and unlocking position.

6. A parking brake valve as defined in claim 5 wherein the remote transmitter and the receiver further comprise conventional security means whereby the parking brake valve is secure from actuation utilizing other than a matched transmitter.

7. A parking brake valve as defined in claim 6 further comprising conventional tamper-protection circuitry and a means for connecting this circuitry to a conventional vehicle alarm system.

8. A parking brake valve comprising:

a base having a top surface and a bottom surface, said top surface having a first integral solenoid mounting area, an integral interface mounting area abutting said first solenoid mounting area and a second integral solenoid mounting area abutting said interface mounting area, said base also having a plurality of mounting means integral to said top surface and bottom surface;

a tubular track having an inner surface, an outer surface, a locking end and an unlocking end, said inner surface and outer surface defining an outer casing, said outer casing defining a plurality of inlet holes and an equivalent number of outlet holes, each extending from said outer surface to said inner surface of said track;

a sled having an outer surface, a stopping end and an unstopping end, said sled also having a plurality of integral, longitudinally abutting stoppers, fluid passers and conventional brake seals, said sled being of such size and shape that it abuts and can slide along said inner surface of said track, said stoppers having a solid outer surface, said outer surface of said stoppers abutting and conforming to said inner surface of said track, said stoppers being of such length that when said sled is in a locking position within said track such that the stopping end of said sled is proximate to the locking end of said track, said stoppers prevent fluid from passing between inlet holes and outlet holes, said fluid passers being H-shaped and being of such length that when said sled is in an unlocking position within said track such that the unstopping end of said sled is proximate to the unlocking end of said track, said fluid passers permit fluid to flow between inlet holes and outlet holes, the brake seals having an outer surface that abuts and conforms to said inner surface of said track, the brake seals being affixed longitudinally between stoppers and fluid passers and extending to, abutting and conforming to said inner surface of said track, thereby preventing the flow of fluid between said stoppers and fluid passers, said sled being comprised of a magnetically attractable material;

sled-moving means for moving said sled within said track longitudinally between its locking position and unlocking position;

actuator means for initiating operation of said sled-moving means and thereby determine the sled position longitudinally within said track;

a braking system interface having an outer surface, an inner surface, a plurality of conventional hydraulic motor vehicle braking system inlet hose connectors and a plurality of conventional hydraulic motor vehicle braking system outlet hose connectors, each inlet hose connector extending from said inner surface of said track, sealingly through an inlet hole and protruding beyond said outer surface of said braking system interface, each outlet hose connector extending from said inner surface of said track, sealingly through an outlet hole and protruding beyond said outer surface of said braking system interface, whereby a conventional hydraulic motor vehicle braking system can be actuated and then moving said sled to its locking position acts to prevent the flow of brake fluid, thereby locking the vehicle braking system in a braking state, and moving said sled to its unlocking position acts to allow the flow of brake fluid, thereby allowing the vehicle braking system to return to a non-interrupted braking state, said braking system interface being affixed to said interface mounting area of said base;

wherein said actuator means comprises a conventional remote transmitter, a conventional frequency matched receiver and a switch, thereby allowing said sled- moving means to be remotely actuated and thus allowing said sled to be remotely moved longitudinally within said track between its locking position and unlocking position;

wherein said remote transmitter and said receiver further comprise conventional security means whereby the parking brake valve is secure from actuation utilizing other than a matched transmitter;

conventional tamper-protection circuitry and means for connecting this circuitry to a conventional vehicle alarm system;

wherein said sled moving means is comprised of two solenoid units, a locking solenoid unit being affixed proximate to the locking end of said track and said first solenoid mounting area of said base, and an unlocking solenoid unit being affixed to the unlocking end of said track and said second solenoid mounting area of said base, said locking solenoid unit containing a locking solenoid and said unlocking solenoid unit containing an unlocking solenoid, thereby actuation of said locking solenoid causes said sled to be magnetically attracted to its locking position anal actuation of said unlocking solenoid causes said sled to be magnetically attracted to its unlocking position; and wherein said solenoids are of a hollow-core type and said sled further comprises a magnetically attractable fluid interrupting rod affixed longitudinally to its stopping end and a magnetically attractable fluid uninterrupting rod affixed longitudinally to its unstopping end, for allowing other sled components to be comprised of materials that are not magnetically attractable.

* * * * *